United States Patent [19]
> Farnam et al.

[11] 3,863,936
[45] Feb. 4, 1975

[54] HIGH TEMPERATURE GASKET STRUCTURE AND METHOD OF PRODUCING SAME

[75] Inventors: Robert G. Farnam, New Lisbon; Michael T. Passarella, Wisconsin Rapids, both of Wis.

[73] Assignee: F. D. Farnum Co., St. Lyons, Ill.

[22] Filed: Mar. 27, 1973

[21] Appl. No.: 345,356

[52] U.S. Cl. ............................ 277/166, 277/235 B
[51] Int. Cl. ............................................. F16j 15/12
[58] Field of Search ........... 277/166, 227, 233, 235, 277/235 B

[56] References Cited
UNITED STATES PATENTS

| | | | |
|---|---|---|---|
| 2,395,243 | 2/1946 | Aukers | 277/255 B |
| 3,202,033 | 8/1965 | Weidner | 277/166 |
| 3,462,161 | 8/1969 | Daubenberger et al. | 277/166 |
| 3,606,357 | 9/1971 | Yonkers | 277/166 |
| 3,661,401 | 5/1972 | Farnam | 277/227 |
| 3,664,676 | 5/1972 | Petersen | 277/166 |
| 3,679,218 | 7/1972 | Farnam | 277/233 |
| 3,794,333 | 2/1974 | Czernik et al. | 277/227 |
| 3,811,689 | 5/1974 | Farnam | 277/235 B |

*Primary Examiner*—Harry N. Haroian
*Assistant Examiner*—Robert I. Smith
*Attorney, Agent, or Firm*—Mann, Brown, McWilliams & Bradway

[57] ABSTRACT

A high temperature gasket structure particularly useful in automotive carburetors but useful in other applications in which the gasket body is formed from a special type of semi-rigid asbestos board having a minimal elastomeric binder content, and with the bolt hole areas densified in part by embedded steel washers in the gasket body to minimize carburetor flange flexing and maintain high torque retention under heat. The gasket structure is intended to serve as a heat insulator and as a partial sound and vibration dampener and can be formed, when required, with upstanding beads to further minimize flexing of the carburetor flange while maintaining a seal.

18 Claims, 12 Drawing Figures

FIG_6_

FIG_7_  FIG_8_

FIG_9_

FIG_10_

HIGH TEMPERATURE GASKET STRUCTURE AND METHOD OF PRODUCING SAME

CROSS REFERENCE TO RELATED APPLICATIONS

The subject matter of this application is related, in part, to the disclosure of our copending application, Ser. No. 120,526, filed Mar. 3, 1971, which in turn is a division and continuation-in-part of our patent application, Ser. No. 764,459, filed Sept. 29, 1970, now matured into U.S. Pat. No. 3,655,210, dated Apr. 11, 1972, which in turn is a continuation-in-part of our patent application, Ser. No. 66,958, filed Aug. 26, 1970, now abandoned.

BACKGROUND OF THE INVENTION

The gasket structure shown in the related applications, above identified, met an urgent need in the automotive industry for throttle body to intake manifold gaskets occasioned by the need to insulate between these two components of the carburetor due to increase in temperature and/or the need to minimize evaporative losses in the carburetor bowl. The gaskets incorporated an asbestos phenolic resin bushing insert at the bolt holes in combination with a vegetable fiberboard core in the body structures, and the gaskets proved very satisfactory in withstanding temperatures up to approximately 400° F.

With the advent of more anti-pollution devices being used in conjunction with automotive engines, the temperatures in the area of the carburetor intake manifold onto which the carburetor is normally mounted may now go as high as 500°/600° F (approximately), with the expectation that, in some applications somewhat higher temperatures may be encountered in the future. In a large number of applications the maximum temperatures that the part discussed encounters, cover only a portion of the gasket or insulator, i.e., in the area where heating air or exhaust gases pass by or through the gasket or gasket insulator. These changing requirements necessitate an entirely new approach to the gasket structure to be used between the intake manifold and the carburetor since neither the asbestos phenolic resin bushings nor the gasket body referred to in the related applications will withstand these higher temperatures. Hand in hand with the temperature durability requirement is the torque retention requirement, which can be divided into two parts: (a) torque sufficient to obtain and maintain the seal in the total operating environment of the carburetor assembly and (b) torque sufficient to obtain and maintain carburetor securement in this total operating environment. The material structures used in the related applications tend to lose torque retention as temperatures rise, which was one reason for using the asbestos phenolic resin bushings. To satisfy both parts of the torque retention requirement it was necessary substantially to improve the torque retention required for sealing and also the torque retention required for securement since the bushings used in the related applications would tend to disintegrate due to heat destruction of the phenolic resin.

In stating temperature conditions, or limitations, as herein referred to, it is important to understand where the temperatures are recorded for test purposes and something of the nature of the heat problem as it relates both to durability of the part described, and the fact that it must serve, for the most part, both as a heat insulator and as a seal.

Test work over a period of years has included monitoring of temperatures at the intake manifold by using thermocouple probes inserted into the manifold and by attaching probes to the mounting bolts that clamp the throttle body to the intake manifold gasket, in a fashion similar to that used by Car Manufacturers in their tests. On one test car for example, recordings indicated a maximum temperature of approximately 425° F during a high speed run with outside temperatures ranging from about 95° to 97° F. One manufacturer in testing a Single Bbl. throttle body to manifold gasket at its Proving Grounds, under conditions simulating the pulling of a trailer up a long slope on a hot day, recorded a maximum temperature of about 602° F, with the temperature dropping off sharply after the heavy load condition was relieved. The same gasket was also tested under simulated conditions on a dynamometer stand, which resulted in a recording of 605° F. In stating herein that a particular material will withstand for example, 600° F continuous when clamped in gasket form in a carburetor assembly, we refer to its use in carburetor assemblies. This important point is made for the reason that when a gasket is made up in accordance with the aforementioned related gasket structures, clamping it up between heavy ground carbon steel blocks at automotive production clamp loads and heating these blocks from the bottom side by placing it on a hot plate with a thermocouple probe inserted in a small hole in the lower clamping plate for a sustained period of time (approximately 22 hours), the related material construction will completely fail. Conversely, the high temperature structure herein disclosed will withstand the temperature and function very satisfactorily, both as a gasket and as an insulator. This same gasket clamped up as above described and heated to approximately 300° F maximum and held, will perform quite satisfactorily and match the after-test appearance and general physical properties of the after-test gasket removed from the test vehicle, which was checked out at 425° F.

Not only is a carburetor assembly in a vehicle a sizeable heat sink, but when the carburetor is operating it has somewhat of a refrigeration effect due to the cooling effect of the fuel-air mixture circulating through the intake manifold in the nature of a relatively cold air blast. This combination heat with cool circulating air involved is the environment in which the part must live and for purposes of this disclosure is the base which we specifically refer to in speaking of temperature resistance. As an example of this a simulated "hot block" test of a single Bbl. gasket was conducted which performed satisfactorily at the 605° temperature referred to above, and like a similarly "hot blocked" sample of related material, both lost all the torque retention, charred and/or shrunk in thickness and the bushings having lost all their torque retention partially disintegrated. Having run numerous tests both on test vehicles and on "hot block" tests it has been possible to correlate and substantiate the fact that temperature durability using "hot blocks" tests, is conservatively 100° to 150° higher insofar as what the gasket actually encounters than that encountered in a vehicle. It is most important to understand this when discussing temperature durability.

There being a host of engine models and car models, each with standard or special features, it becomes impractical to conduct tests on every car — from a gasket manufacturer's standpoint. However, this relatively simple "hot block" method has been developed and has been found to correlate very well with the many tests that the Car Manufacturers conduct for heat durability. Specifically, gaskets or gasket insulators that have been submitted for test come back with results that establish the heat durability along with the other environmental requirements.

The primary object of this invention, therefore, is to provide gasket structures suitable for these high temperature applications, although the improved structures may be used in lower temperature applications as well.

Further and other objects of the invention will become apparent as the disclosure proceeds and the description is read in conjunction with the accompanying drawings.

DESCRIPTION OF THE INVENTION

Most gasket structures are necessarily a compromise in order to reasonably satisfy the numerous functional requirements for the gasket. As above pointed out, for example, torque retention is an important requirement for both maintenance of the seal and maintenance of part securement. Steel bushings have been used around gasket bolt holes in the past and in a few cases today. As the need arose to reduce carburetor bowl evaporative losses, the steel bushings had to be replaced with a structure that would still maintain securement torque and at the same time be a poor heat conductor, or a better insulator. Applicant's assignee is currently making many thousands of parts daily using asbestos phenolic resin bushings. With the arrival of higher temperature conditions beyond that which the bushings will withstand, as previously referred to, an entirely new bolt hole area reinforcement is required to satisfy both parts of the necessary torque retention requirements. Another major requirement that needed an answer was a gasket structure that would serve as a heat insulator and a seal in the operating environment under these higher temperature conditions, and similar to the related applications, be semi-rigid to readily conform to the out-of-smoothness and out-of-flatness conditions present in production carburetor to intake manifold assemblies.

When one considers all of the many requirements for a satisfactory gasket structure, i.e., such characteristics as deflection, conformability, sealability, heat durability, resistance to deterioration from fuels passing thru the part, flange clamping deflection, uneven clamp loading, strength, compressibility, torque retention, etc., it is obvious that rather precise gasket structures and combinations of materials are necessary to provide practical solutions to the ever-present and growing problems in gasketry.

In the present invention, which uses the carburetor gasket by way of illustration, the gasket is intended for use in a carburetor equipped with anti-pollution systems, including the feeding back of a certain amount of exhaust gases to the intake manifold or the feeding back of hot air. These systems may feed these gases over the face of the gasket or, in some cases, directly thru the gasket. Other parts of the total system may result in higher overall intake manifold temperature. These exhaust gases may be as high as 600°/700° F. It is important to note that the temperature which the throttle body to manifold gasket must withstand when the vehicle is operated under heavy load, as hereinbefore described, may be very high. It is generally easier under operating conditions, to control the temperature in the fuel bowl, since there is a considerable amount of moving air generated by the engine fan and the fact that the vehicle is in motion.

There is an additional problem to be satisfied which is referred to as "heat soak." This condition occurs and becomes critical when the engine has been shut off, i.e., after a hard run on a hot day with very little air movement around the vehicle. Under this condition, the manifold temperature drops but for a period roughly up to 50 Min., depending on the environmental conditions and the particular vehicle, the fuel bowl temperature rises up to a peak and then drops. The gasket, here serving as an insulator, also becomes extremely important in that it is necessary to minimize, if not eliminate, the amount of evaporative losses from the heated gasoline.

Figure 1:
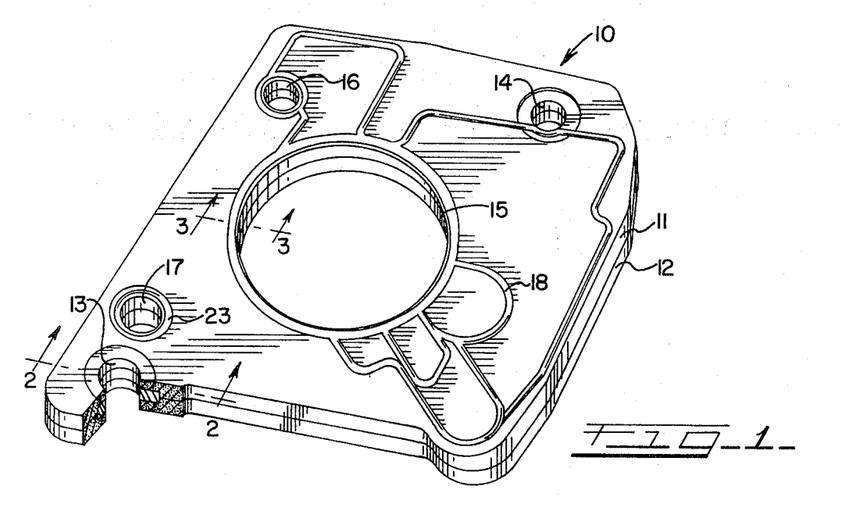
FIG. 1 is a perspective view showing a gasket structure made in accordance with this invention, with a portion of the gasket cut away at one of the bolt holes to better illustrate the construction in that area.

Referring now to FIG. 1, it will be seen that the gasket indicated at 10 comprises upper and lower halves 11 and 12 having bolt holes 13 and 14, a single barrel carburetor part 15 and exhaust gas ports 16 and 17. Continuous sealing beads 18 are formed during the fabrication of the gasket, as will be hereinafter described, on the upper and lower faces of the gasket structure, the exact pattern being dictated by the exigencies of a given application.

The two halves 11 and 12 of the gasket structure are preferably formed of asbestos fiberboard characterized by relatively short fibers and low binder content, and during the fabrication process, when the two halves are joined together, a steel washer shown at 21 is embedded in each of the bolt hole areas 13 and 14 as will be described later in more detail. Suffice it to say here that in the area of the bolt hole, and preferably to the extent of a diameter width equivalent to the diameter of the washer, the bolt hole areas are densified substantially above the density of the surrounding gasket structure, and this densified area is defined in FIG. 2 at 22 by the slight depression below the surface of the surrounding portion of the gasket. In this view, a separate raised bead 23 for sealing the area around the exhaust gas port 17 is also shown. In this construction the bead principle is used to minimize flange deflection and obtain a seal while the whole body of the gasket is compressed slightly in arriving at the final clamp load.

We have characterized the semi-rigid asbestos board as having relatively short fibers with an elastomeric binder. These fibers are graded as to length and they are well opened up, or "de-fiberized" as it is referred to in terms of the diameter of the individual fibers. Asbestos fibers are graded in a standard screen test, and length of fiber is important in a structure of this kind in order to develop a uniform structure without clumps or clots that go hand-in-hand with asbestos sheets or boards make from fibers with considerably longer length.

The binder content is on the order of approximately 10 to 12 percent, which together with the short fibers, renders the sheet highly compactable and conformable as these terms relate to pressing the parts of their finished density and densifying the board at the bolt hole areas with the use of steel washers, beading the part when required, and ending up with a finished product that is still conformable enough to surface seal when clamped in an assembly, and compactable enough to seal through the body of the part with adequate torque to maintain the seal and to maintain securement in the total environment.

The beads 18 and 23 are integral with the body portion of the gasket 10, and their free height is above the level of the remainder of the gasket. Therefore, when the gasket is clamped between opposing faces of the carburetor and manifold flanges, the relatively soft beads are first compressed for sealability, and then the clamping bolts are brought down upon the densified bolt hole areas to provide firm clamping of the carburetor in place with appropriate sealing, conformability and deflection characteristics, all as described later.

Figure 2:
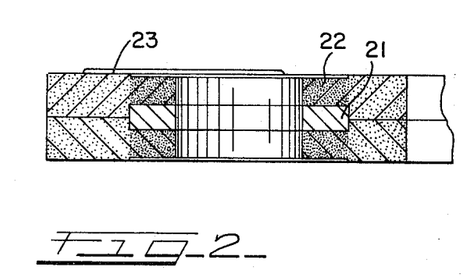
FIG. 2 is a cross-sectional view, taken along the line 2—2 of FIG. 1, showing a preferred embodiment of the invention.
Figure 4:
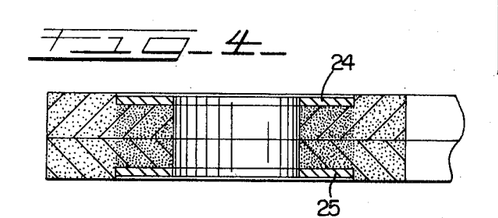
FIG. 4 is a modified form of the invention in which two metal washers are used as part of the densification in the bolt hole areas.

Instead of having a single washer 21 embedded in the gasket structure, as shown in FIG. 2, it is also feasible to employ top and bottom metal washers 24 and 25, with these being embedded in the structure to a depth slightly below that of the surrounding faces of the gasket. This variation is illustrated in FIG. 4.

Figure 5:
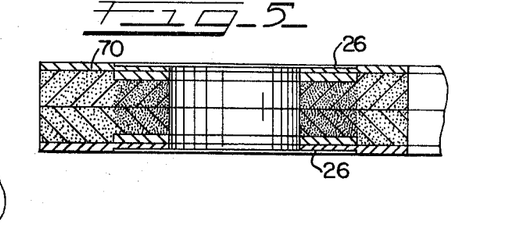
FIG. 5 is a view showing a modification of the form of the invention shown in FIG. 4.

FIG. 5 shows a modification of the structure illustrated in FIG. 4, the difference being that both faces of the gasket structure have a very thin sheet of the same material from which the remainder of the gasket body is constructed, adhesively secured to the respective outer faces of the gasket body, and during the fabrication process when the bolt hole areas are densified, as hereinafter described, the bolt hole area is compressed to provide a slight recess, as shown at 26 in FIG. 5. A similar structure can also be made using a high temperature thin sheet packing, such as manufactured by Raybestos-Manhattan under Grade A56. The thickness of this type of sheet packing is critical where approximately 0.015 inch to 0.020 inch would be about the maximum thickness usable. This type of sheet packing has very long asbestos fibers and is, from a practical standpoint, is almost impossible to bead when required. Therefore, in order to form a bead, a very thin sheet is necessary in order to develop the bead from the more conformable body stock onto which the thin sheet has been adhesively secured.

Figure 6:
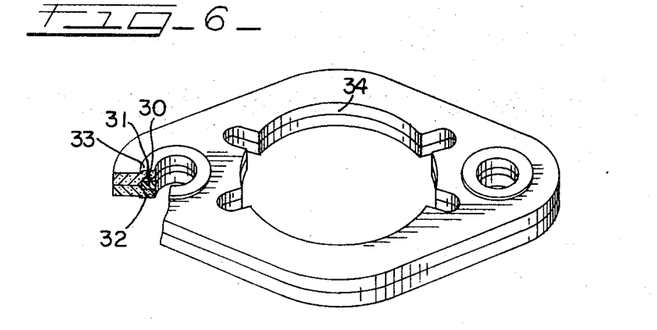
FIG. 6 is a perspective view showing a modified form of single barrel carburetor gasket in which the densifying area around the bolt hole with the embedded washer is below the planar surface of the remainder of the gasket.

In FIG. 6, another form of single barrel carburetor gasket is shown, and, in this case, no beading is used. As before, the top and/or bottom surfaces of the gasket are formed to lie slightly above the densified bolt hole areas, as shown in the break-away section at the left of FIG. 6. Here again, the bolt hole area has an embedded metal washer 30 with densified portions above and below the washer, as indicated at 31 and 32, and with the depressed bolt hole area being indicated at 33. The carburetor passageway is indicated at 34.

Figure 7:
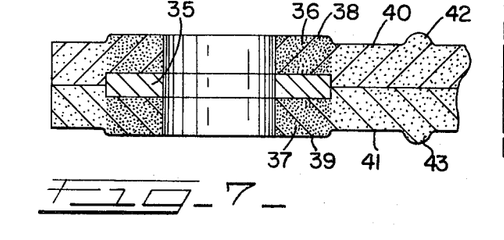
FIG. 7 is a cross-sectional view showing another modification of the gasket structure of FIG. 1 with a metal washer embedded in the center and in which the bolt hole area of high density has its top and bottom planar surfaces above the main portion of the gasket structure, but below the beaded areas which are of relatively low density.

In the embodiment of the invention shown in FIG. 7, the bolt hole area comprises a metal washer 35 with densified areas 36 and 37 on either side thereof, but in this case the top surface 38 and bottom surface 39 of the densified bolt hole area lie above the adjacent planar surfaces 40 and 41, respectively, of the gasket body. The beads 42 and 43, shown in the top and bottom faces of the gasket, may be the type shown in FIG. 1, and for the same purpose, and in this instance the gasket thickness through the beads 42 and 43 is slightly greater than the gasket thickness in the bolt hole area. The reason for this is so that, when the gasket is compressed between flanges 44 and 45, which may represent the lower flange of the carburetor body and the upper flange of the intake manifold, respectively, the tightening of the nut 46 on the clamping bolt 47 causes the relatively soft beads 42 and 43 to be compressed, and the bolt hole densified area to be compressed to a lesser degree, thereby leaving air spaces 48 which enhance the insulating characteristics of the gasket structure.

MATERIALS AND METHOD OF FABRICATION

Inasmuch as this invention seeks to provide a gasket structure capable of withstanding relatively high temperatures in the range of 550°F to 600°F, and even higher, it is apparent that the materials used for the heat insulating gasket disclosed in Farnam et al. U.S. Pat. No. 3,655,210 are unsuitable for this higher range of temperatures. The vegetable fiberboard, being composed of cellulosic fibers, cannot withstand these higher temperatures, and it has been found that the asbestos phenolic resin bushings are also incapable of withstanding the higher temperatures.

We have found that by using a semi-rigid asbestos board made of relatively short fibers and reinforced, or bonded, with a low percentage of Hi Temp Elastomer, such as made by the Colonial Board Co. of Manchester, Conn. — their product No. 651, we can fabricate the herein-described insulating gasket for high temperature use, particularly when we combine with this semi-rigid asbestos board a densified bolt hole area which utilizes one or more metal washers as part of the densified structure.

The term "asbestos millboard" applies to a type of asbestos board, which is made at various densities and with virtually no binder or filler, up to those boards that have binders such as starch added for a little strength, and even fillers like Portland cement adding strength, hardness and density. None of the millboards have elastomeric binders. The word "millboard" is a trade name and experiments were conducted with various forms of millboard for the herein-described applications before arriving at a satisfactory board such as the one disclosed. The word "fiberboard" is a trade term to cover a much broader variety of vegetable fiber boards such as those used to make the related core structures of the insulator gasket and also covering boards used in other industries. The fiberboard used in the related core structures is made special for the applications referred to.

It should be reiterated with respect to the present asbestos board that relatively short fibers are important, low binder content is important, and a very uniform structure is important to gain all of the desirable properties needed for fabrication of the finished part.

Preferably, the semi-rigid asbestos board has good insulating properties, as later described, and is characterized by having relatively short chrysotile asbestos fibers with maximum length of approximately 0.187 inch and minimum length of approximately 0.040 inch, oriented in a relationship of about 1.3 to 1.0 in length to width of the board. An important reason why the fibers should be relatively short and oriented as indicated, is to facilitate densification of the bolt hole area and body area, and for formation of the upstanding integral bead during the hot press formation of the gasket. It is, likewise preferred that the fibers be well opened up and relatively free from entangled fibers, rock-like spindles or clumps of unopened fibers to provide a high degree of structural uniformity.

Although asbestos fibers as above described have been found to be very suitable for the body structure of the gasket, other non-cellulosic fibers may be used, such as fiberglass or other ceramic fibers (such as manufactured by Carborundum Co. of Niagara Falls, N.Y.). Blends of asbestos fiber with other non-cellulosic high temperature fibers might also be used.

The inorganic high temperature binder, preferably an elastomer, which is relatively non-hygroscopic, plays an important part in the total structure. Recognizing that the type of elastomer suitable for this application is relatively higher in cost than the asbestos fibers, economics necessitate a relatively low percentage of about 10 percent to 12 percent. Structural necessities likewise dictate the use of a lower percentage for the suitable elastomers have relatively poor torque retention at the required temperatures as compared to the asbestos fibers. In the total structure, the required elastomer must be high enough to bond the fibers, provide a highly conformable seal, be heat-resistant and/or, if and when burned, leave a residue that still bonds the fibers while remaining resistant to the chemical and physical environment of the assembly. The relationship of the binder and fiber must be such that when the gasket is tightly clamped in a carburetor assembly, the clamp load is carried substantially by the fibers and not by the elastomer. The relationship must also be such with respect to binder vs fiber that the uniform structure will readily compact to seal, bead in a mold and be readily densifiable, particularly in the reinforced bolt hole areas heretofore mentioned. Materials such as Chemigum No. 520 or LCG No. 4100X manufactured by Goodyear Tire And Rubber Co. of Akron, Ohio are typical examples of a high temperature elastomer suitable for use as a binder.

The metal washer used in the gasket construction shown in FIGS. 1 and 2 is made of carbon steel, with a thickness of approximately 0.080 inch, an internal diameter of 0.360 inch, and an outside diameter of 0.620 inch for use with a 5/16 inch clamping bolt. Of course, the dimensions will vary according to conditions, and other metals and alloys may be used instead of carbon steel. In this particular part the gasket body is nominally 0.250 inch thick with upstanding beads 0.010 inch to 0.014 inch high.

When the top and bottom washers are used in the densified area, as shown at 24 and 25 in FIG. 4, the washer, to cite a typical example, may have a thickness of 0.045 inch each, with a body thickness at nominally 250 inches and a body density of nominally 85 lb/ft$_3$.

Typically, for the form of the invention shown in FIGS. 1 and 2, the two halves 11 and 12 of the gasket structure may have an initial thickness of approximately 0.150 inches for each half, making the comined initial thickness 0.300 inches. These two half thicknesses are, in a typical form of the invention having a density of approximately 60 to 70 lb/ft$_3$, placed together with a suitable high temperature adhesive interposed between the two halves in a hot pressing operation. During the hot pressing operation, the total thickness may be compacted to about 0.245 inches to 0.260 inches, and simultaneously the upper and lower beads 42 and 43 are formed by the recesses 50 and 51 cut into the die blocks, corresponding in size, shape and contour to the bead configuration desired for the particular gasket.

The semi-rigid asbestos board used in the making of the gasket structure may have an initial density of 60 to 70 lb/ft$_3$ but after compaction the body portion may have its density increased to about 85 lb/ft$_3$ and the bolt hole area increased to possibly 140 to 150 lb/ft$_3$ due to the interposition of the metal washers 21 between the two halves. The beaded areas 42 and 43 will have a density of something less than 85 lb/ft$_3$ and possibly on the order of 75 lb/ft$_3$. Since it is expected that most of the parts discussed in this application will be used in the automotive industry, and this industry being extremely competitive, economics play a major role. Consequently, we have run studies on performance vs. density, with consideration being given to the design of each particular part. We find a range between approximately 75 to 90 lb/ft$_3$ is entirely practical, with the possibility that some applications may permit somewhat lower densities and others require somewhat higher densities.

Figure 9:
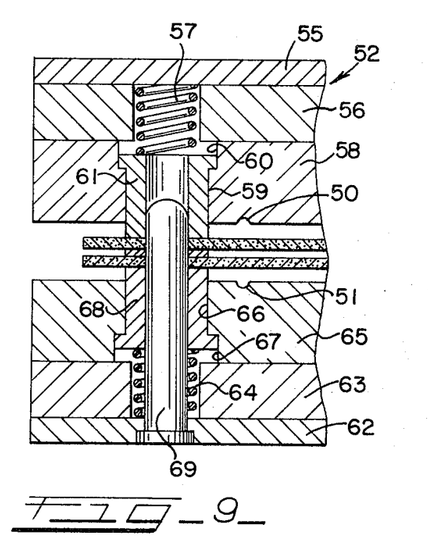
FIG. 9 discloses the manner in which the bolt hole area is densified with a metal washer embedded in the mid section of the gasket, in the mold.
Figure 10:
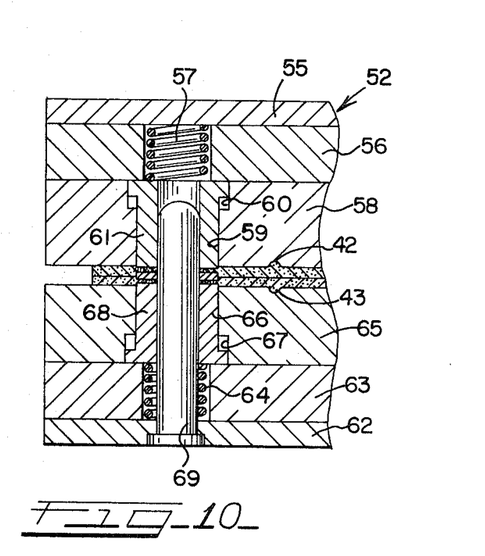
FIG. 10 shows the formation of the densified bolt hole area when the dies are closed.

It will readily be seen by referring to FIGS. 9 and 10 that in fabricating the gasket a pin mold, generally designated 52, may conveniently be used, comprising an upper mold half, generally designated 53, and a lower half, generally designated 54, with the upper mold half comprising a backup plate 55, a spring retainer plate 56, a high compression spring 57 located in the spring retainer plate, and a mold plate 58 into which a cavity 59 is machined with a counterbore 60. A top setting plug 61 is adapted to travel in the cavity 59 against the force of spring 57. The groove 50 is machined into the face of the mold plate 58 to form the sealing bead 18 on the top face of the gasket.

The lower mold half 54 is constructed in a similar manner. Its components are a backup plate and pin retainer 62, a spring retainer plate 63, a high compression spring 64 located in the spring retainer plate, a mold plate 65 having a bore 66 therein provided with a counterbore 67, and a bottom setting plug 68 which travels in the bore 66 under influence of the spring 64. A pin 69 anchored in the backup plate 62 extends through the spring 64, bottom setting plug 68, and, when the mold is fully open (not shown), the upper end of the pin is clear of the upper setting plug 61 so that the gasket components may be mounted on the pin. There are, of course, similar upstanding pins at other places on the mold to properly locate the gasket components on the mold.

It is apparent that by properly selecting the lengths of the setting plugs 61 and 68 and the depths of the counterbores 60 and 67, it is possible to obtain a variety of conditions of densification of the bolt hole areas as well as variations of the relative levels between the densified bolt hole areas and the adjoining body portion of the gasket. For example, in the particular selection of mold components that are shown in FIGS. 9 and 10, the mold when it is closed against stops (not shown), under pressure and under appropriate heat conditions will simultaneously unite the gasket halves and bond them together with the cementitious material that is provided on the inner face of one or both of the two halves, and will densify the bolt hole areas to the extent that the level of the densified areas will be below the surface of the body portion. A typical below-surface dimension of the densified area would be on the order of about 0.005 inch per side with the body portion of the gasket at about 85 lb/ft$_3$ density. It is readily possible to provide a densified bolt hole area with the surface of the densified area above the surface of the part. Assuming that a densified area density of 140 lb/ft$_3$ was needed for the example just cited, the difference can be readily obtained by simply increasing the thickness of the embedded steel washer for the application requiring above-surface gasket densification. Also, during the closing of the mold, compaction of the gasket halves will force the material into the grooves 50 and 51 to form the beads 42 and 43.

Since the molds are closed against stops (not shown) to a pre-determined distance between the mold plates 58 and 65, and since the semi-rigid asbestos board is capable in the unpressed condition of some considerable compaction and conformation, this permits the formation of distinct and uniform upstanding beads and densified bolt hole areas as above described, and precise gasket shapes and structures can be economically manufactured to satisfy the ever more stringent gasketing requirements, for example, in the automotive industry.

One of the major reasons why the semi-rigid asbestos board can be satisfactorily densified at the bolt hole areas and have upstanding beads formed on the top surface is because the asbestos fibers are relatively short for a board of this type and well split so they have relatively uniform very small diameters, with almost complete freedom from large clumps or spindles of unopened fibers. Clumps or very large diameter unopened fibers in narrow flanged parts make for non-uniform structures that definitely produce gasket "leakers."

The fibers in the particular sheet used are orientated to provide a board that is close to being square. For example, tensile strength which illustrates this point, when checked in the unpressed condition, runs approximately 550 PSI A.M.D., (across machine direction), and 700 PSI M.D., (machine direction) which is a ratio of 1.27:1.00. Were the sheet near square but with a substantially longer fiber, to yield for example 2,000 PSI, and still in a very low binder sheet, it would be extremely difficult if not virtually impossible, to form the beads and densify the bolt hole area, or compact it enough with clamping bolt pressure, to close the voids for sealing. It will be noted in FIG. 1 that bead 18 is actually formed entirely through the highly densified bolt hole area, illustrating further how readily the system can be used to tailor a particular part to meet a particular set of conditions.

It is believed that the principal reason for the gasket's high performance in torque retention, namely 70 to 75 percent after being clamped between heavy ground steel blocks and torqued to the user's initial torques and heated for 24 hours at 650°F, is the method of forming the gasket structure, as previously described. It will be understood that as the two halves, or blanks of the semi-rigid asbestos board, each of which is provided with the necessary die cuts and including the bolt holes, are placed in the mold with a cementitious material therebetween to form a laminate and with the metal washers placed between the blanks at the bolt hole areas, it is thereby possible when the mold is closed, to obtain the differential in densities and more particularly, the relatively high density that is needed for the bolt hole areas. It is this high density which produces the required physical property of good torque retention and this is obtained without sacrificing to any appreciable extent, the necessary thermal insulation in the bolt hole areas.

In the form of the gasket shown in FIGS. 1 and 2, it is generally contemplated that the bolt hole area will be coined either flush with the adjacent body or possibly a few thousandths below this level or a few thousandths above this level, so that when the gasket is in place between flanges to be clamped together, the relatively soft beads 18 will first be compressed to provide sealing and thereafter the flanges will be bolted tightly against the bolt hole areas, developing little or no compaction of the adjacent body portion. This has the effect of minimizing clamping flange deflection and distortion. The variables in structure, previously referred to as "tailoring" and as here described, are further enlarged due to the fact that the metal washer thickness can, at the same time, be varied to provide the degree of density needed for a particular carburetor assembly.

In FIG. 5, the fiber-reinforced elastomer packing 70 is an asbestos elastomer sheet and overlaps the washers 24 and 25, and during the fabrication of the gasket in the manner shown in FIGS. 9 and 10, the densified bolt hole area is formed with the recesses 26, which again may be on the order of five to fifteen thousandths below the adjoining portions of the gasket. This thin cover sheet over the top of the steel washers may be of the same material as the gasket body or a high temperature fiber elastomer reinforced sheet. A suitable asbestos elastomer sheet packing would be that identified as No. A-56, obtainable from Raybestos-Manhattan.

A typical dimension for the form of the gasket shown in FIG. 7 might be to compress the gasket halves during formation of the unified gasket to the extent that the densified bolt hole area would have an overall thickness of 0.245 inch, the plateau area or main portion of the gasket body would have an overall thickness of 0.226 inch, with the beaded area having an overall thickness of 0.257 inch. This would mean that the densified bolt hole area would be 0.0095 inch above the main portion or plateau area of the gasket, while the beaded areas 42 and 43 would be 0.0155 inch above the main portion of the gasket. Also, this would mean that the beaded area was approximately 0.006 inch above the level of the densified bolt hole area.

The above, of course, is only by way of specific illustration, and the invention may be variously embodied with different relative dimensions between the bolt hole areas, the body portion and the beaded areas, if any. Another typical relationship might be where the gasket structure of FIGS. 1 through 3 inclusive has a body portion thickness (after compacting and in finished form) of 0.250 inch; the carbon seal washer 21 has a thickness of 0.080 inch, and inside diameter of 0.360 inch, and outside diameter of 0.620 inch; the bolt hole area is depressed, as shown at 22, from zero to 0.005 inch below the adjacent body portion of the gasket; and the bead 18 is 0.014 inch high and has a width of 0.065 inch. Again, this is but an illustration of specific relationships for a given application of the gasket structure.

For the form of the invention shown in FIGS. 4 and 5, the body portion of the gasket structure (i.e., exclusive of the densified bolt hole areas and the beaded areas) may have a density of approximately 65 to 85 lb/ft$^3$; the density in the bolt hole areas may ordinarily be from 20 percent to 100 percent higher than that in the body area, with 40 percent to 60 percent being more or less typical; and the beaded area, when beads such as 18 are used, has a density of approximately 1 percent to 15 percent less than that of the body portion of the gasket. The carbon steel washers 24 and 25 may be 0.025 inch thick, have an internal diameter of 0.341 inch and an outside diameter of 0.703 inches; and inch; cover stock 70, if such is used, is desirably Raybestos-Manhattan No. A-56 and may have a nominal thickness of 0.020 inch for each side of the gasket.

The semi-rigid asbestos board, preferably used in fabricating the gasket, is known by the trade designation of No. 651, as furnished by the Shufibre Division of Colonial Board Co., located in Manchester, Connecticut. It has a fiber length of approximately three-sixteenths inch to one-sixteenth inch, and held together by a high-temperature elastomeric binder comprising approximately from about 5 percent to 15 percent by weight of the total board.

The adhesive used for uniting the two halves of the gasket during fabrication is similar in character to the adhesive used in bushed and/or beaded gaskets described in the related applications hereinbefore identified.

Although, in most instances, the gasket will be formed by embedding the washer 21 between the two halves of the gasket, it is, of course, possible to use a single thickness of semi-rigid asbestos board when the steel washers are applied to the outer face of the gasket, as shown in FIGS. 4 and 5.

MORE SPECIFICS AND TEST DATA

In order to withstand the rigorous requirements of high temperature use, meaning temperatures above that which are suitable for the type of heat insulating gasket disclosed in our prior U.S. Pat. No. 3,655,210, the basic structure and combined of the body section of inch. gasket is of great importance, with particular attention given to the effect that these higher temperatures referred to (on the order of 600° F.) have on the sealing properties (being much more severe), as well as on the torque retention. Even the clamping bolts are affected in that this degree of temperature is approaching the critical point in inch clamping bolts. We have inch, that by using an insulating chrysotile asbestos board — semi-rigid — reinforced with high-temperature elastomer, having the property of being relatively non-hygroscopic when pressed and clamped between the clamping flanges in the assemblies described, we can satisfactorily provide exceptionally good sealing ability, heat durability, thermal insulation, and with the above described densified bolt hole areas, exceptionally good torque retention. Obviously, other types of fibrous non-organic boards having like properties could be used, i.e., boards constituted from fiberglass and/or fiberglass blended with asbestos and having suitable high-temperature elastomer binders. We have found that the semi-rigid board designated as No. 651 made by Shufibre Div., of Colonial Board Co. is satisfactory for our purposes. This board, in addition to having the above-mentioned properties that are necessary in addition to other important physical properties, also has the capability of compaction and high conformation asbestos board herein described, after fabrication into the finished parts, including the molding operations, is a little fragile to the extent that in very narrow flanged areas, it can be broken when roughly handled, and the surface of the board, in both the beaded and unbeaded areas, can become scuffed in rough handling. To provide for this contingency, it is contemplated that the finished parts would be coated with a very light coating of high-temperature resin, having the characteristics of a thin varnish, by applying the coating to a thickness of 0.0003/0.0005 inch as optimum, although more or less coating may be applied to suit the particular circumstances. It is contemplated also that suitable release coatings may be applied to the part, as is common in the art.

We have found that by providing a semi-rigid asbestos board with relatively short uniform and well-opened fibers and with a high-temperature binder content of not more than 5 to 15 percent by weight, and by using the metal washer in the densified areas of the gasket as hereinbefore described, we can obtain performance characteristics that readily adapt to the rigorous requirements for a gasket that must operate in temperatures well above 450° F recorded in an operating assembly, as previously described. For example, using the No. 651 material, and fabricating a gasket with the following dimensions and specifications, a Single Bbl. Gasket was tested, with the following particulars:

The torque retention at the clamping bolts was approximately 70 to 75 percent, as opposed to 30 to 35 percent, with the use of the steel washers and coining to densify the bolt hole area. The Leak-Drop (Vacuum Sealing) characteristics were quite satisfactory before and after the 22-hour exposure to heat of 650°F in a clamped position. The condition of the gasket, after removal, exclusive of some considerable discoloration, was exceptional in that there had been no significant effect from the heat soak, with not over 5 percent loss in strength. It is important to recognize that the compressibility of a particular gasket is selected and must be tailored to meet the conformation requirements of a particular assembly. The other physical properties, such as Fluid Immersions, help identify the properties of the product that works and serve as a partial guideline only to performance.

Figure 8:
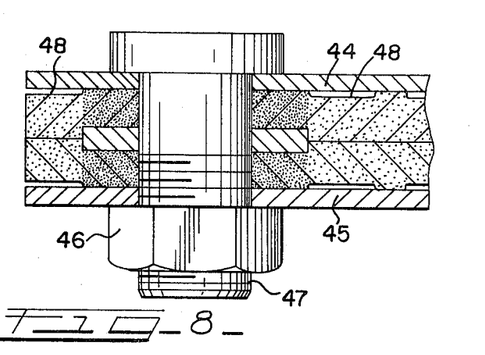
FIG. 8 shows the gasket structure of FIG. 7 and compressed between two mating flanges, whereby providing an air gap over a substantial portion of the gasket structure.
Figure 11:
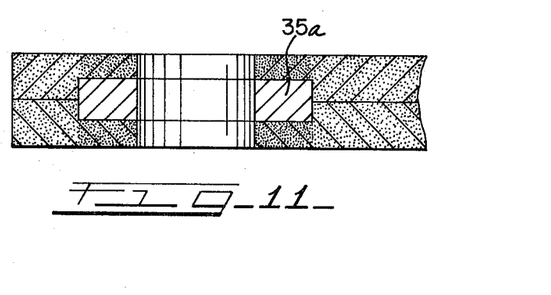
FIG. 11 shows an embedded steel washer with the coined area directly over the washer flush with the top and bottom surfaces of the gasket body.
Figure 12:
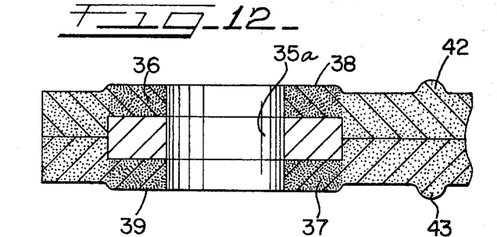
FIG. 12 shows a construction where the coined area has been inverted to provide a boss on either side of the gasket and utilizing steel washers of increased thickness.

The gasket structures shown in FIGS. 11 and 12 illustrate the versatility of the system, which permits very practical and simple tailoring of the gasket structures to accommodate the multiplicity of conditions that need to be met in carburetor mountings and assemblies in the automotive industry. These gasket forms represent further modification from those illustrated in FIGS. 7 and 8 including relatively thicker steel washers 35a embedded between the gasket layers.

FIG. 11 shows an embedded steel washer with the coined area of the gasket directly over the washer flush with the top and bottom surfaces of the gasket body. While shown in a gasket structure without beads this feature can be employed in a gasket with beads as well as the one made without beads. The density of the gasket body would be set to provide for enough compression and compaction to obtain and maintain a seal with the available clamping torque. In this construction the gasket, when clamped would be a little thinner than the starting thickness but with the bolt area already substantially densified due to the embedded steel washer, which can be selected to suit the required condition.

FIG. 12 represents another variation which is not necessarily intended as an air-gapped variation. This variation resulted from studies made in developing a particular gasket structure for one of the automotive companies involving a single Bbl carburetor (IFC), where the throttle body in this installation was such a light structure with only two clamping bolts initially, but which necessitated the use of more bolts eventually, and wherein the clamp load was so lacking in uniformity that the slightest pressure would bend, or deflect the throttle body. After considerable development work and experimentation, which included study of the actual deflection on the throttle body, it was found that by increasing the thickness of the embedded steel washers from 0.080 inch to 0.095 inch and inverting the coined areas to provide a boss on either side of the gasket, in the particular gasket material used, it was possible to minimize the amount of deflection by several thousandths of an inch. As an illustration of just how sensitive and delicate some of the conditions can be the bosses around the bolt holes were set at 0.008/0.010 inch on one side and at 0.012/0.014 inch on the second bolt. These factors are described herein to lend emphasis to the fact that the structural features of the present gasket are such that it can readily be tailored for any requirements to accommodate what, in effect, is a series of specific requirements for each of a host of parts and wherein it is possible to do so with practical economics when the gasket goes into production. This helps to demonstrate the practical way of densifying the gasket material around the bolt holes by the use of embedded steel washers inserted between the layers of the gasket material.

Other relevant tests are as follows:

LEAK DROP TESTING AT ROOM TEMPERATURE AT 20FT-LB. TORQUE(in 30 sec.)

In this test a gasket made in accordance with this invention and having a body density (as distinguished from the bolt hole areas and the beaded areas) of 85 lb/ft$^3$ was tested against a gasket of the type shown in our earlier U.S. Pat. No. 3,655,210. The testing method involved the use of heavy ground steel blocks with the insulator gasket torqued therebetween to 20 ft-lb. using production type ⅜ inch diameter machine bolts. One of the clamping steel blocks was drilled to accept a pipe fitting. Using a small vacuum pump controlled with valving and a manometer to record actual negative pressure, a vacuum was pulled to various inches of mercury, at which point the line leading to the vacuum is valved off. Then using a stop watch, the drop in vacuum is observed at the end of 30 seconds with a total chamber volume of approximately 100cc. The chamber volume is the total volume between the clamping blocks (gasket bore) and the piping up the shut-off valve. With this arrangement, the following results were obtained.

| Vacuum in Chamber 18"Hg Internal Vac. | Test Sample Using NO.651 Material with Density 85 lb/ft$^3$ | Comparison Sample (per Pat. 3,655,210) |
|---|---|---|
| 18"Hg Internal Vac. | 3.75 | (3.15) |
| 20"Hg | 4.15 | (4.10) |
| 22"Hg | 4.65 | (4.50) |
| 24"Hg | 5.15 | (5.0 ) |

The above test method is one of many that can be used for testing seal against vacuum, but it does demonstrate that the type of gasket herein disclosed and claimed, using No. 651 material or similar material, is very close in performance to the earlier type heat insulating gaskets which have been satisfactorily used extensively in engines having lower temperature parameters.

HEAT DURABILITY AND TORQUE RETENTION

In this test, the test specimens made according to this invention and employing the No. 651 material with the buried washer in the bolt hole area is placed between ground carbon steel blocks approximately nine-sixteenths inch thick using production machine bolts three-eighths inch in diameter and torqued to 20ft-lb. The test assembly is placed on a large electric hot plate with a metal hood over it, holes are drilled in the top and bottom plate to accommodate the thermocouple probe, which is inserted. The hot plate, in turn, is adjusted to hold a temperature of 650°F., plus or −8°, and the specimen is allowed to soak at this temperature for 22 hours. Following the soak period, torque is checked in a tightening direction after cooling, and it was found that the torque retention was on the order of 70 percent to 75 percent, which is highly acceptable for this gasket application. When the same specimen was similarly treated, but with the metal washer 21 eliminated, (this resulted in the bolt hole area density the same as the gasket body density namely 85 lb/ft$^3$) the torque retention was only on the order of 30 percent to 35 percent.

The test samples showed approximately a 5 percent loss in strength through flexing, which also is acceptable. There was some discoloration of the part half way up from the hot side, due to the binder. Specimens that had been checked for vacuum drop results, without the above described heat soak treatment, gave about the same results as specimens that were subjected to the heat soak cycle.

TEST CAR RESULTS

The test car employed was a 1971 4-door Impala with 3-speed hydramatic transmission and air conditioning and a large RPD two barrel carburetor.

The test car instrumentation included temperature probes at the fuel bowl, throttle body, intake manifold, engine block and crankcase, with a dial switch to indicate temperatures.

Figure 3:
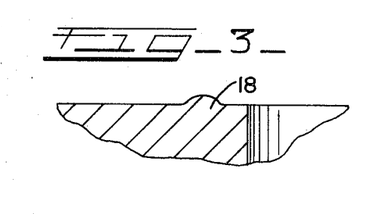
FIG. 3 is a cross-sectional view, taken along the line 3—3 of FIG. 1, showing one of the beads on one or both faces of the gasket.

Three different gaskets made in accordance with the present invention, as embodied in FIGS. 1–3 inclusive, were installed with the three samples having body portion densities of 80, 85 and 90, respectively, and each were removed after 500 miles of testing. These gaskets did not, however, have beads to the thicknesses indicated.

The results of the tests were as follows:

| Description | No.651 | Density (lb/ft$^3$) | |
|---|---|---|---|
| | 80 | 85 | 90 |
| Initial Thickness | .220 | .215 | .199 |
| After 500+ miles | .211 | .211 | .196 |
| Difference | .009 | .004 | .003 |
| % Set | 4.0 | 2.0 | 1.5 |
| Off-Torque | 75.0 | 82.5 | 83.5 |
| Weepage | No | No | No |
| MPG | 14/15 | 14/15 | 14/15 |
| Peak Fuel Bowl °F | 162 | 167 | 157 |
| Outside Temp. °F | 47 | 50 | 40 |
| K Factor (BTU-In/Ft$^2$/Hr./°F) | 1.50/1.76 | 1.69/1.99 | 1.70/1.82 |
| Fuel Bowl Temp. Rise | 82°F | 109°F | 123°F |

There are several comments that should be made with respect to the above test results:

a. The off-torque percentage was determined in a tightening direction;

b. The peak fuel bowl temperature obtained on a particular day with the hood closed, and with the outside temperature being as indicated in the chart above, was the highest temperature recorded by the probe after the engine had been shut down, and before it ultimately started to cool down standing outside. This peak temperature was reached within 50 minutes after the engine shut-off; and c. The K factor test was conducted by an independent laboratory using CencoFitch apparatus with a clamp load of 50 PSI at 212°F. The K factor of currently used insulator gaskets of the type disclosed in our prior U.S. Pat. No. 3,655,210 ranges from approximately 1.0 to 1.25.

In the above chart, the fuel bowl temperature rise is the difference between the peak fuel bowl temperature referred to above and the maximum reached in the fuel bowl while the car was being driven at speeds of roughly 65 to 75 miles per hour.

FLUID IMMERSION FOR 22 HOURS AT ROOM TEMPERATURE

Thickness of test specimens in these tests was approximately 0.215 inches as this thickness was picked because the actual thicknesses being used range from approximately 0.090 inches to approximately 0.250 inches (a few applications run approximately 0.300 inches). This thickness was picked to provide a fairly representative thickness for test purposes.

In respect to sealability, a thickness of 0.130 inches was selected as this is the nominal thickness of the quad throttle body to bowl gasket. The sealability requirement in the specifications is most important, and the test conducted with this thickness provides information more significant than tests run in a heavier thickness.

The test results for the other properties are comparable with currently used insulator type material, (like that used in our earlier U.S. Pat. No. 3,655,210) as used for the Chevrolet Div. Throttle body to manifold gasket for the Quadrajet carburetor. The test results are as follows:

| | Density 85 |
|---|---|
| A.S.T.M. Fuel B | |
| Thickness Change % | 7.0 |
| Weight Change % | 31.2 |
| A.S.T.M. No. 3 Oil | |
| Thickness Change % | 5.1 |
| Weight Change % | 35.8 |
| Distilled Water | |
| Thickness Change % | 8.7 |
| Weight Change % | 33.5 |
| COMPRESSIBILITY AT 5,000 PSI | |
| As Received | 18.2 |
| Cond. Type 1 | 15.9 |
| RECOVERY | |
| As Received | 57.3 |
| Cond. Type 1 | 60.6 |
| SEALABILITY AT 1,000 PSI | 26.6 |

SUMMARY

FABRICATION, DESIGN AND HANDLING PROPERTIES

The No. 651 Board being a semi-rigid asbestos board bonded with a relatively low percentage of high-temp elastomeric binder, fabricates in substantially the same manner as the conventional products referred to in the above patent. One property that shows particularly improved performance is that the board in its fabricated form, appears to be capable of providing surface sealing without the necessity for asbestos elastomer linings such as those currently being used. The beading properties appear to be feasible without requiring liners. The principal purpose of the upstanding bead is to provide, when required, a structure that can overcome out-of-flatness and/or rough finish and seal with minimum deflection of the bendable flanges.

After experimenting with numerous bead shapes, the rounded bead shape has been found to be the most practical. The bead width, depending on available flange width, should be in the range of 0.040/0.080 inches with an approximate height of 0.007/0.020 inches. Substantial numbers of gaskets manufactured by applicants assignee, at present, use phenolic asbestos bushings at the bolt holes to minimize and control deflection, and at the same time provide high torque retention to secure the assembly of the part. These reinforcing bushings are currently formed in the gaskets as the parts are made, in which process the bushing develops both a friction and fused fit for bushing securement. The asbestos phenolic bushings are suitable for clamped up temperature installations at about 450°F. Where it becomes necessary to provide bolt hole reinforcement at temps beyond 450°F., the embedded steel washers of this invention raise the density directly over the surface of the washers to a range of 130/140 lb/ft$^3$ which, in turn, raises the torque retention, as developed from the foregoing tests at 650°F. from approximately 35 percent to 75 percent.

This method of reinforcement provides a practical, workable arrangement since the steel washer thickness can be varied. In a gasket requiring an upstanding bead, this design with the embedded steel washers can include a bead running 0.060 inches from the edge of the bolt hole directly through the coined area. The density of the upstanding bead will be directly proportional to the density of the body portion from which the bead is formed and where the bead passes through the coined area, the bead height to be formed can be the same height or a lesser height, depending on what is necessary with the available strength and clamp load.

The fact that the semi-rigid asbestos board sheet from which the present gasket is formed is structured from relatively short asbestos fibers to provide uniformity of structure and with a minimum amount of reinforcing binder to gain maximum heat resistance, provides a sheet that is less resistant to scuffing but a protective skin of covering may be provided which can take the form of a very thin tough coating that will withstand rough handling without damage. As indicated in the structure shown in FIG. 5 utilizing coating 70 or a high temperature resin coating as referred to herein before. This surface condition becomes particularly important where the part is beaded and/or the seal is dependent more or less entirely on the bead. This coating may have a thickness of approximately 0.0003 inches/0.0005 inches keeping it very thin. The coating, may also incorporate, if required, anti-stick properties by including with the coating a light coating such as colloidal graphite.

It is known from prior experience that by using the gasket construction of FIG. 7, wherein air gaps 48 separate the core material of the gasket from the clamping flanges, the heat insulating value of the gasket as a whole may be substantially enhanced.

The embodiments of this invention in which an exclusive property or privilege is claimed are defined as follows:

1. A high temperature gasket comprising:
   a. a body portion formed of semi-rigid asbestos board having minimal elastomeric binder content and having a density within the range of 65 to 100 lb/ft$^3$, and
   b. a bolt hole portion integral with the body portion, but having a density from 25 percent to 250 percent higher than that of the surrounding body portion, and including a metal washer retained within such bolt hole portion.

2. A high temperature gasket as set forth in claim 1 wherein said body portion has a density within the range of about 75 to about 90 lb/ft$^3$.

3. A high temperature gasket as set forth in claim 2 wherein said bolt hole portion has a density within the range of about 120 to 175 lb/ft$^3$.

4. A high temperature gasket as set forth in claim 1 wherein said gasket is coined in said bolt hole portion whereby the level of the densified area is disposed flush with at least one surface of the gasket body portion.

5. A high temperature gasket as set forth in claim 1 wherein said gasket is coined in said bolt hole portion whereby the level of the densified area is disposed above at least one surface of the gasket body portion.

6. A high temperature gasket as set forth in claim 1 wherein said gasket is coined in said bolt hole portion whereby the level of the densified area is disposed below at least one surface of the gasket body portion.

7. A high temperature gasket as set forth in claim 1 in which the gasket also includes an integral bead formed on at least one surface of the gasket and having a density less than that of the adjoining body portion.

8. A high temperature gasket as set forth in claim 7 in which the densified bolt hole portion extends above the level of the adjoining body portion but below the level of said raised bead.

9. A high temperature gasket as set forth in claim 7 in which said bead overlies said densified bolt hole portion.

10. A high temperature gasket as set forth in claim 1 in which said bolt hole portion is coined to a depth not more than about 0.015 inches below the surface of the adjacent body portion on at least one side.

11. A high temperature gasket as set forth in claim 1 in which the body portion has a density of about 75 to 95 lb/ft$^3$ and the bolt hole portion has a density of about 110 to 140 lb/ft$^3$.

12. A high temperature gasket as set forth in claim 1 in which a metal washer is embedded on both faces of the gasket structure concentric with said bolt hole portion, and in which the semi-rigid asbestos board between said washers is compacted to said higher density.

13. A high temperature gasket as set forth in claim 12 in which said body portion of the gasket has applied to at least one side asbestos reinforced elastomeric packing material.

14. A high temperature gasket as set forth in claim 1 wherein one or more surfaces of said body portion are covered with a high temperature, anti-scuff coating having a thickness in the range of about 0.0003 inches to about 0.0005 inches.

15. A high temperature gasket as set forth in claim 1 wherein the elastomeric binder content is in the range of about 5 percent to about 15 percent by weight.

16. A high temperature gasket as set forth in claim 1 in which said board is composed of asbestos fiber having a fiber length between approximately 0.187 inches and 0.040 inches.

17. A high temperature gasket as set forth in claim 16 in which the asbestos fibers are oriented in the relationship of about 1.3 to 1.0 in length to width of the board.

18. A high temperature gasket as set forth in claim 1 in which said gasket is characterized by high performance in torque retention, namely over 50 percent.

* * * * *

UNITED STATES PATENT OFFICE
CERTIFICATE OF CORRECTION

Patent No. 3,863,936  Dated February 4, 1975

Inventor(s) Robert G. Farnam and Michael T. Passarella

It is certified that error appears in the above-identified patent and that said Letters Patent are hereby corrected as shown below:

"[73] Assignee: F. D. Farnum Co., St. Lyons, Ill." should be ---[73] Assignee: F. D. Farnam Co., Lyons, Ill.--- Column 12, line 15 "combined" should read ---composition---; line 16, delete "of inch"; line 23, "inch" should be ---found---.

Signed and Sealed this fourth Day of May 1976

[SEAL]

Attest:

RUTH C. MASON
*Attesting Officer*

C. MARSHALL DANN
*Commissioner of Patents and Trademarks*